April 17, 1962  M. V. DE JEAN  3,030,528
MAGNETIC CORE AND METHOD OF ASSEMBLY
Filed March 13, 1959
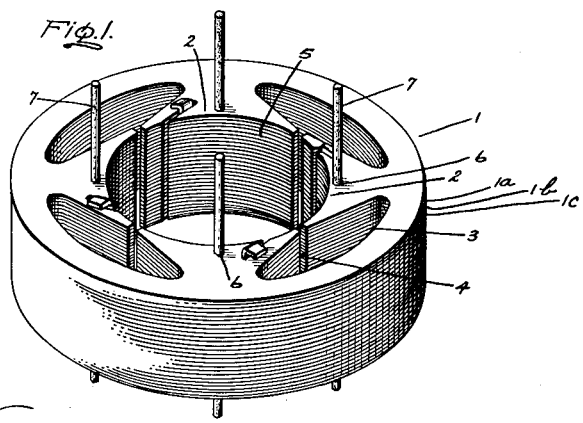
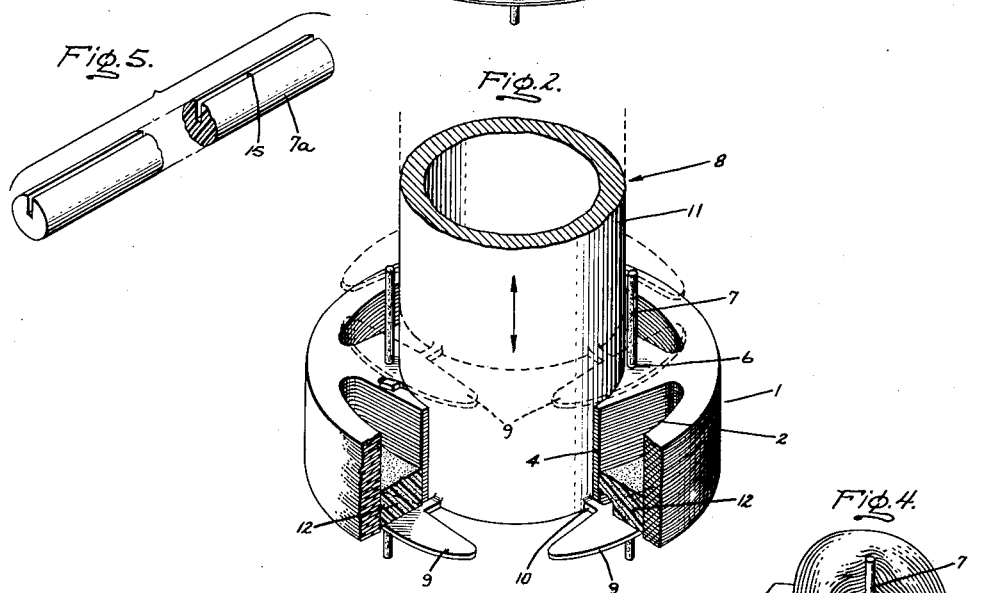
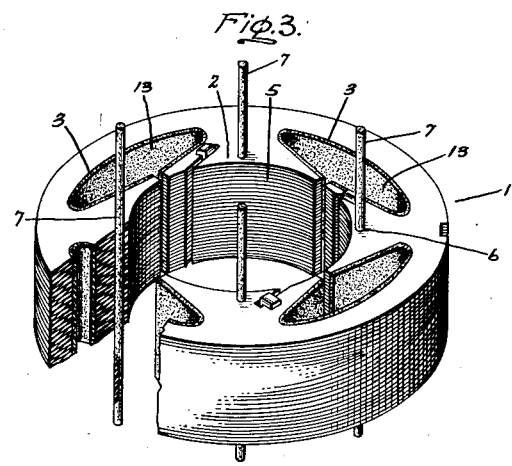
Inventor:
Milton V. De Jean,
by Andrew J. Booz
Attorney.

United States Patent Office 3,030,528
Patented Apr. 17, 1962

3,030,528
MAGNETIC CORE AND METHOD OF ASSEMBLY
Milton V. De Jean, Fort Wayne, Ind., assignor to General
Electric Company, a corporation of New York
Filed Mar. 13, 1959, Ser. No. 799,150
13 Claims. (Cl. 310—42)

This invention relates generally to magnetic cores for inductive devices and to methods for assembling cores, and more particularly, to a unitary core and to a method for forming a unitary core from core laminations and for applying an integral insulating and bonding coating to the walls of winding slots of dynamoelectric machine core members.

Dynamoelectric machines, i.e., motors and generators, conventionally include a stator core member and a rotor core member concentrically disposed within the stator member and defining an air gap therewith, at least one and frequently both of the members having a plurality of winding poles formed thereon; in the case of the stator member, the winding poles conventionally extend radially outward from the bore. These core members are conventionally formed of a plurality of relatively thin laminations punched from magnetic steel and thus, the winding poles generally have bores or other sharp edges thereon. Dynamoelectric machines in the small frame sizes conventionally have their windings, which are positioned on the winding poles, formed of enameled magnet wire and thus, if such windings were merely positioned on the poles without other insulation, the bores and other sharp edges would tend to cause breaks in the enameled insulation on the wire and thus short circuits to ground would result. For this reason, it has been conventional to employ separate insulators for the poles of the dynamoelectric machine core members, such insulators being formed of such materials as kraft paper, cellulose acetate, or the newer plastic films. In addition, it has been conventional to provide separate insulators at each end of the core. Such individual pole and end insulators have been in themselves expensive and their installation has added appreciably to the overall costs of the machines.

It has further been conventional to secure the core laminations into a unitary core member by keying, riveting, welding and the like. However, such manufacturing processes are expensive and their use adds appreciably to the overall cost of the finished machine.

Certain types of cores, for example, the stator core of salient pole machines, series field structures, and certain types of core constructions, have conventionally employed winding pins which have heretofore performed the function of retaining the ends of the windings or coils on the poles clear of the rotating parts of the machine. Conventionally, the winding pins have been inserted partially into the core in winding pin holes in the core members; each pin extending from one side of the core member, two aligned pins conventionally being used to retain the end coils of the winding at each side of the core member.

U.S. Patent application Serial No. 775,260, filed November 20, 1958, now Patent No. 2,978,371, by Nick Baciu and assigned to the same assignee as the instant invention, discloses a film coating method whereby an integral insulating and bonding coating can be applied to slots between the poles in the core. Another well known method of applying an insulating coating on a core member is by dipping the core into the coating material and then baking the coating material for bonding strength. In the application of insulating and bonding coating according to these methods, difficulty exists in holding the stator laminations together as a core until the integral insulation can be applied and cured.

For these reasons, a practical, economical manufacturing process for holding the stator laminations as a core until the insulating and bonding material can be applied and cured is desirable. It is particularly desirable that the stator core be held together, at least temporarily, during the above described insulating and bonding processes without the employment of keys, rivets, welds, external holding fixtures and the like. A method of holding stator cores in assembled relation independent of integral insulation or bonding material is also desirable.

It is, therefore, an object of this invention to provide an improved unitary core for an electric inductive device.

A further object of the instant invention is to provide an improved method of retaining core laminations in a unitary core.

A further object is the provision of an improved method of holding core laminations together during the application of insulating and bonding material.

Briefly stated, according to the instant invention a core of the type employing winding pins is held together by the use of through winding pins tightly fitted in the winding pin holes through the poles of the core so that the pins frictionally engage the sides of the hole to provide adequate strength during further manufacturing processes. In one modification, the winding pins may provide adequate strength without the aid of insulating and bonding coating; the pins therefore serve the dual function of securing the core laminations into unitary core and retaining the winding ends. In further modifications, the winding pins are used to retain the core laminations in assembled relation while insulating and bonding material is applied to the core; the winding pins again serve the dual function of retaining the winding ends and securing the laminations into a unitary core while further manufacturing and assembling processes are performed thereon.

The invention together with additional objects and advantages thereof will be best understood from the following description of specific embodiments, when read in connection with the accompanying drawing, in which:

FIG. 1 is a pictorial view of a stator core assembled with winding pins;

FIG. 2 is a pictorial view illustrating a method of applying integral insulation and bonding fluid;

FIG. 3 is a pictorial view showing a stator core secured together with winding pins and containing a coating of integral insulation and bonding material;

FIG. 4 is a partial pictorial view illustrating the retention of the coil winding ends by the winding pins; and FIG. 5 is a pictorial view of an improved winding pin which facilitates assembly of the pins and stator core.

Referring to FIG. 1, there is illustrated a core 1 composed of a plurality of laminations of 1a, 1b, 1c, etc. Each lamination contains a plurality of winding poles 2 thereon; between each of the poles are formed spaces or slots 3; each slot has a narrow neck 4 opening into a central bore 5. Each lamination further contains a plurality of holes therethrough located in the poles 2 of the core 1 for the purpose of securing a winding pin therein. The stator core laminations 1a, 1b, 1c etc. are stacked in aligned position thereby forming through holes or openings 6 through the stack for winding pins, and further aligned to form the poles 2 adapted to have coils wound thereon after assembly and insulation of the slots 3 of the core 1.

According to the instant invention, a plurality of one-piece winding pins 7 are forced through the holes 6 and have a portion thereof extending on each side of the core 1. The winding pins 7 are a tight fit in the holes 6 and frictionally engage the sides of the holes; the winding pins may be assembled through the holes 6 by, for example, pressing the pins 7 therethrough. The pins are preferably, but not necessarily, plastic, for example, of polyester glass material. Such a winding pin, when assembled in the stator core, provides adequate strength for securing the core while further manufacturing and assembling steps are performed on the core. Plastic winding pins have been found to be particularly well suited for this application in that they tend to bind and, therefore, to securely retain the laminations into a unitary core.

Such a plastic winding pin, when assembled with the stator core laminations may provide adequate strength to secure the core in a unitary structure without the aid of additional binding material. However, the above method of securing the core is particularly well adapted for holding the core laminations during the application of insulating or bonding coating material. FIG. 2 illustrates the application of a fluid coating according to the above mentioned Baciu disclosure. The stator core 1 is held together as a unitary core by the plurality of winding pins 7 in the holes 6. A fluid applicator 8 containing a plurality of spreaders 9 having the general configuration of the slots 3 between the poles 2 but having a predetermined clearance from the surfaces of the slots is axially aligned with the stator. A narrow guide portion 10 connects the plurality of spreaders 9 to a central cylinder 11; the guides 10, slidable in necks 4, and cylinder 11, slideable in bore 5, cooperate to align the applicator 8 within the stator core. There is no significant clearance between the guide 10 and the neck 4; the guide 10, must, of course, form a sliding fit with the neck 4. With the spreaders 9 at one end of the slots, fluid coating material 12 is introduced on top of each spreader. The applicator 8 and slots 3 are then moved relative to each other so that the spreaders 9 pass through the slots 3; a fluid coating 13 (FIG. 3) will be drawn on the inside surface of the winding poles 2 in a generally uniform layer equal in thickness to the clearance between the spreaders 8 and the walls of the winding poles 2 or slots 3. A portion of the fluid coating material will be drawn, by capillary action, between the laminations in the area of the slots. The coating may then be hardened or cured, for example, by baking as better described in the above referenced Baciu application.

The coating material may, for example, be a heat hardenable epoxy resin introduced in a somewhat viscous fluid form. It has been found that a thixotropic coating fluid produces very satisfactory results. The coating material may then be drawn, by capillary action, between the laminations in the area of the slot, and, as better explained in the aforementioned Baciu disclosure, will firmly bind the laminations into a unitary core after curing of the resin.

The coated core is illustrated in FIG. 3. The laminations are now firmly secured together jointly by the winding pins 7 and the bonding strength of the coating 13. It can also be seen from FIG. 3 that the winding pins 7 extend entirely through the rotor core 1 and outwardly from the core at both sides thereof.

As previously stated, the primary function of the winding pins is to retain the ends of the coils, which are later wound on the poles 2, out of interference with the moving parts of the machine. This primary function of the pins is best illustrated in FIG. 4 where a pin 7 extends through the core 1 and retains the end turns of winding 14 on each side of the core outwardly from the periphery of the bore 5 of the core 1.

While some difficulty has been experienced in forcing winding pins 7 through the winding pin holes 6, it has been found that a longitudinal slot in the winding pin will permit the winding pin 7 to be more readily assembled with the core 1. Such a winding pin is illustrated in FIG. 5, shown to an enlarged scale. The solid, one-piece winding pin 7a contains a longitudinal groove 15. Because of the ease of assembly of this type of pin with the stator, it may be desirable, but not necessary, to use such a slotted winding pin in assembling a stator core according to the instant invention.

In accordance with the patent statutes, I have described what at present are considered to be the preferred embodiments of my invention. However, it will be obvious to those skilled in the art that various changes and modifications may be made in the disclosed structure without departing from my invention, and it is, therefore, aimed in the appended claims to cover all such changes and modifications as fall within the true spirit and scope of my invention.

What I claim as new and desire to secure by Letters Patent of the United States is:

1. A method of forming a core for a dynamoelectric machine, said core being composed of laminations having poles formed thereon and having holes through said poles and forming slots between the poles; comprising the steps of stacking a plurality of said laminations with the holes aligned to form openings through the poles, forcing solid, one-piece elongated winding pins composed of non-magnetic material tightly fitted into the openings and extending through the openings and outwardly from the poles at both sides thereof to thereby hold the laminations, introducing coating material into said slots in a state of plasticity, drawing said insulating material along the surface of said slots in a generally uniform layer, and hardening said layer to form an insulating and bonding coating over said surface, the core being firmly secured together jointly by the winding pins and the coating material.

2. A method of forming a core composed of laminations having poles thereon and containing holes through said poles, for a dynamoelectric machine of the type having coils wound on said poles on the core, the coil end turns extending on each side of the poles; the method comprising the steps of stacking a plurality of said laminations with the holes aligned to form openings through the poles, forcing solid, one-piece elongated winding pins composed of non-magnetic material tightly fitted into the openings and extending through the openings and outwardly from the poles at both sides thereof thereby holding the laminations, introducing coating material into slots formed between the poles in a state of plasticity, drawing said insulating material along the surface of said slots in a generally uniform layer, and hardening said layer to form a firm coating over said surfaces, whereby said laminations are firmly secured together jointly into a unitary core by the elongated winding pins and the coating material and whereby the elongated winding pins are adapted to perform the dual function of securing of the laminations into said unitary core and retaining the end turns of the coils out of interference with other parts of the dynamoelectric machine.

3. A method of forming a core composed of laminations having poles containing holes therethrough for a dynamoelectric machine of the type having coils wound on the poles on the core, the coils having end turns extending on each side of the pole, the method comprising the steps of stacking a plurality of said laminations with the holes aligned to form openings through the poles, inserting solid, one-piece elongated winding pins composed of non-magnetic material and longitudinally slotted tightly fitted into the openings and extending through the openings and outwardly from the poles at both sides thereof, whereby the elongated winding pins are adapted to perform the dual function of holding the laminations and retaining the end turns of the coils out of interference with other parts of the dynamoelectric machine, spacing a spreader from the surface of slots formed between the poles to form a predetermined clearance between the spreader and the surfaces of said slot, introducing coating material into said slots in a state of plasticity on one side of said spreader, moving said spreader and slot relative to each other to draw said coating material through said clearance in a generally uniform layer, and hardening said coating to form a firm coating over said surfaces of said slots whereby the laminations are firmly securely secured together jointly by the winding pins and the coating.

4. A method of forming a core composed of laminations having poles containing holes therethrough for a dynamoelectric machine of the type having coils wound on the poles on the core, the coil end turns extending on each side of the poles; the method comprising the steps of stacking a plurality of said laminations to form openings through said poles, inserting solid, one-piece elongated winding pins longitudinally slotted and composed of non-magnetic material into the openings and extending through the openings and outwardly from the poles at both sides thereof, whereby the elongated winding pins are adapted to perform the dual function of holding the laminations during the application of coating material and retaining the end turns of the coils out of interference with other parts of the dynamoelectric machine, spacing a spreader in slots formed between the poles with a predetermined clearance therebetween, introducing coating material onto one side of said spreader, moving said spreader and slot relative to each other to draw said coating material through said clearance, further drawing a portion of said coating material between said laminations by capillary action, and hardening said coating material to bond said laminations together, said laminations being firmly secured together jointly by the winding pins and the coating material.

5. A core for a dynamoelectric machine comprising a plurality of laminations aligned and stacked to form a bore and poles having openings therethrough adjacent said bore, the poles being adapted to have coils later wound thereon, and elongated winding pins composed of non-magnetic material tightly fitted into said openings and extending through the openings and outwardly from the poles at both sides thereof, whereby the elongated winding pins are adapted to perform the dual function of holding the laminations and retaining the end turns of the coils out of interference with other parts of the machine.

6. A core according to claim 5 wherein the elongated winding pins are solid, one-piece plastic pins containing a longitudinal groove to facilitate the insertion thereof into said openings.

7. A core according to claim 5 and including coating material in slots formed between the poles whereby the laminations are firmly secured together into a unitary core jointly by the winding pins and coating material.

8. A stator core for a dynamoelectric machine comprising a plurality of laminations in juxtaposed relation to form a stack having a bore, side faces, and a plurality of poles with holes disposed adjacent said bore extending through said poles, a plurality of coils arranged around said poles radially outward from said holes, said coils having end turns extending beyond each side face of said stack, an elongated winding pin composed of non-magnetic material disposed in each opening in tight engagement therewith projecting axially outwardly beyond each stack side face, said winding pins engaging said coil end turns to retain said end turns away from said bore and to hold the laminations together.

9. A method of forming a core for use in a dynamoelectric machine composed of a plurality of laminations having a bore and coils arranged therein adjacent said bore, with end turns extending beyond each side of the core, each lamination including holes near said bore, said method comprising the steps of stacking a plurality of said laminations with the holes aligned to form openings therethrough, and inserting elongated winding pins, each formed of non-magnetic material with a longitudinal slot, into said openings in tight engagement with said laminations and a portion of said pins projecting outwardly from the core at each side thereof thereby securing the laminations into a unitary core and providing means for retaining the end turns of the coils out of interference with other parts of the dynamoelectric machine.

10. A method of forming a core for use in a dynamoelectric machine composed of a plurality of laminations each having winding accommodating means and holes disposed in said laminations adjacent said means comprising stacking a plurality of said laminations with the holes aligned to form openings therethrough; compressing elongated winding pins formed of non-magnetic material, each having a longitudinal slot, while inserting said pins into the openings in tight engagement with said laminations and with a portion of each pin extending outwardly from each side of the stack of laminations thereby retaining the laminations in juxtaposed relation; and applying a coating of insulating and bonding material into the winding accommodating means of the core while the laminations are held together by said winding pins whereby said core laminations are firmly secured together conjointly by said winding pins and coating material.

11. A method of forming a stator core for use in a dynamoelectric machine composed of a plurality of laminations having a bore, winding accommodating means and holes disposed in said laminations adjacent said bore, comprising stacking a plurality of the laminations with the holes aligned to form openings therethrough; compressing single piece elongated winding pins formed of non-magnetic material, each having a longitudinal slot, while inserting said pins into the openings in tight engagement with said laminations and with a portion of each pin extending axially beyond each side of the stack of laminations, the pins retaining the laminations in juxtaposed relation; applying coating of insulating and bonding material into the winding accommodating means of the core while the laminations are held together by said winding pins; and hardening said coating whereby said core laminations are firmly secured together conjointly by said winding pins and coating material.

12. A stator core for a dynamoelectric machine comprising a plurality of laminations in juxtaposed relation to form a stack having a bore, winding accommodating means each having a coating of insulating and bonding material, at least one opening extending through said stack between adjacent winding accommodating means, elongated winding pins of non-magnetic material disposed in said openings in tight engagement therewith projecting axially beyond each side face of said stack, each pin having a longitudinal slot therein to facilitate insertion thereof into said openings, a plurality of coils arranged in said winding accommodating means with end turns engaged and maintained radially beyond said bore by said pins, said coating and winding pins conjointly securing said laminations together in a firm and rigid relationship.

13. A stator core for a dynamoelectric machine comprising a plurality of laminations arranged in juxtaposed relation to form a stack having a bore, a plurality of teeth defining poles having aligned holes substantially centrally of and through said poles in close proximity with said bore, and winding receiving slots having a coating of insulating and bonding material, single piece solid elongated winding pins of non-magnetic plastic material disposed in said holes in tight engagement therewith and projecting axially beyond each side face of said stack, said winding pins each formed with a longitudinal slot therein to facilitate insertion thereof into said holes, a pluralty of coils arranged in said winding receiving slots with end turns engaged and maintained radially beyond said bore by said pins, said coating and winding pins conjointly securing said laminations together in a firm and rigid relationship.

References Cited in the file of this patent

UNITED STATES PATENTS

| | | |
|---|---|---|
| 1,778,678 | Knecht | Oct. 14, 1930 |
| 1,870,085 | Apple | Aug. 2, 1932 |
| 1,934,903 | Apple | Nov. 14, 1933 |
| 2,479,330 | Fagley | Aug. 16, 1949 |
| 2,506,637 | Fog | May 9, 1950 |
| 2,603,674 | Kock | July 15, 1952 |
| 2,705,763 | Skrobisch | Apr. 5, 1955 |
| 2,766,392 | Wagner | Oct. 9, 1956 |
| 2,923,484 | Roberts | Feb. 2, 1960 |